United States Patent [19]

Miyataka et al.

[11] Patent Number: 5,338,788
[45] Date of Patent: Aug. 16, 1994

[54] POLYVINYL CHLORIDE PLASTISOL SEALER COMPOSITION

[75] Inventors: Koji Miyataka, Fort Lee, N.J.; Takashi Nakayama, Takatsuki, Japan

[73] Assignee: Sunstar Giken Kabushiki Kaisha, Osaka, Japan

[21] Appl. No.: 894,365

[22] Filed: Jun. 4, 1992

[30] Foreign Application Priority Data

Jun. 7, 1991 [JP] Japan ................... 3-136448

[51] Int. Cl.⁵ ............................................. C08K 5/29
[52] U.S. Cl. ................................. 524/197; 524/567
[58] Field of Search ............................ 524/197, 567

[56] References Cited

U.S. PATENT DOCUMENTS 4,983,655 1/1991 Nakata et al. .................... 524/101
5,055,522 10/1991 Ikeda et al. ...................... 525/124

*Primary Examiner*—Joseph L. Schofer
*Assistant Examiner*—Peter D. Mulcahy
*Attorney, Agent, or Firm*—Wegner, Cantor, Mueller & Player

[57] ABSTRACT

A polyvinyl chloride plastisol sealer composition comprising (A) a polyvinyl chloride resin containing hydroxy group or carboxy group in the molecule, (B) a blocked polyisocyanate compound, and (C) an isocyanuric acid compound containing two or more groups selected from epoxy group, hydroxy group and carboxy group in the molecule, which is particularly useful for sealing the panels of automobile body without undesirable cracking of the coating films of the intercoat-paint and/or topcoat-paint applied on the sealer.

4 Claims, No Drawings

POLYVINYL CHLORIDE PLASTISOL SEALER COMPOSITION

This invention relates to a polyvinyl chloride plastisol sealer composition, more particularly a cross-linking polyvinyl chloride plastisol sealer composition which can prevent undesirable cracking of the coating film(s) of intercoat-paint and/or topcoat-paint formed on the layer of the sealer composition, which occurs during the baking and/or cooling steps of the coating films. Said sealer composition is useful as a body-sealer of automobiles in an automobile assembly line.

PRIOR ART

In the automobile assembly line, a sealer is usually used for sealing the automobile body, for example, a certain polyvinyl chloride plastisol composition comprising a polyvinyl chloride resin, a plasticizer, a filler and optionally an adhesive promoter. The sealer is usually used for effecting a watertight and hermetic seal at the joint of panels of the automobile body and exhibits the sealing effects by gelling at the time of baking of the paint in the steps of intercoating and/or topcoating after the application of the sealer. However, during the steps of baking at 140° to 160° C. for 20 to 30 minutes and subsequent cooling thereof, the sealer expands with heating and then shrinks, which causes undesirable cracking of the formed paint-coating films on the sealer and can not give good appearance of the coated paints and further can not exhibit sufficiently the desired sealing effects.

BRIEF DESCRIPTION OF THE INVENTION

The present inventors have intensively studied to find an improved sealer composition which can prevent such undesirable cracking of the coating films on the sealer, and have found that a crosslinking sealer can prevent movement of sealer during the baking and cooling steps and thereby can achieve the desired prevention of cracking of the coating film on the sealer.

An object of the invention is to provide an improved polyvinyl chloride plastisol sealer composition which can prevent undesirable cracking of the coating films on the sealer during =he baking and cooling steps of the intercoat-paint and/or topcoat-paint. Another object of the invention is to provide a crosslinking sealer composition which can inhibit the movement of the the sealer composition and thereby can prevent the undesirable cracking of the paint coating films such as the intercoat and/or topcoat on the sealer. These and other objects and advantages of the invention will be apparent to those skilled in the art from the following description.

DETAILED DESCRIPTION OF THE INVENTION

The polyvinyl chloride plastisol sealer composition of the invention comprises (A) a polyvinyl chloride resin containing a hydroxy group (OH) or a carboxy group (COOH) in the molecule (hereinafter, referred to as "crosslinkable PVC"), (B) a blocked polyisocyanate compound, and (C) an isocyanuric acid compound containing two or more groups selected from epoxy group, hydroxy group (OH) and carboxy group (COOH) in the molecule.

The crosslinkable PVC (component A) includes a copolymer of vinyl chloride with a monomer containing OH or COOH in the molecule (e.g. 2-hydroxyethyl acrylate, 2-hydroxyethyl methacrylate, 2-hydroxypropyl acrylate, hydroxybutyl vinyl ether, maleic acid, maleic anhydride, acrylic acid, methacrylic acid, etc.). The component A may optionally be incorporated by a-conventional polymer resin for plastisol, such as a conventional polyvinyl chloride resin or vinyl chloride/vinyl acetate copolymer resin.

The blocked polyisocyanate compound (component B) is prepared by blocking a polyisocyanate compound such as aliphatic polyisocyanates (e.g. hexamethylene diisocyanate, lysine diisocyanate, etc.), alicyclic polyisocyanates (e.g. hydrogenated diphenylmethane diisocyanate, isophorone diisocyanate, hydrogenated tolylene diisocyanate, etc.), aromatic polyisocyanates (e.g. tolylene diisocyanate, diphenylmethane diisocyanate, naphthylene diisocyanate, xylylene diisocyanate, etc.), trimere or dimers of these polyisocyanates, or propolymers which are produced by reacting one of the above polyisocyanates with a compound containing an active hydrogen such as a polyol, with a blocking agent, i.e. a compound containing an active hydrogen, such as alcohols (methanol, ethanol, propanol, butanol, benzyl alcohol, phenyl cellosolve, furfuryl alcohol, cyclohexanol, etc.), phenols (phenol, cresol, xylenol, p-ethylphenol, o-isopropylphenol, p-tert-butylphenol, p-tert-octylphenol, thymol, p-naphthol, p-nitrophenol, p-chlorophenol, etc.), oximes (e.g. formamide oxime, acetamide oxime, methyl ethyl ketone oxime, cyclohexanone oxime, etc.), acid amides (e.g. acetanilide, acetanisidide, acetamide, benzamide, ε-caprolactam, etc.), active methylene-containing acid esters (e.g. dimethyl malonate, diethyl malonate, ethyl acetoacetate, etc.), mercaptanes (e.g. methylmercaptane, thiophenol, tertdodecylmercaptane, etc.), amines (e.g. diphenylamine, phenylnaphthylamine, aniline, carbazole, etc.), imidazoles (e.g. imidazole, 2-ethylimidamole, etc.), carbamates (e.g. phenyl N-phenylcarbamate, 2-oxamolidone, etc.), imines (ethyleneimine, etc.), aulfites (e.g. sodium bisulfite, potassium bisulfite, etc.), and the like. The blocked polyisocyanate compound is de-blocked by heating at the step of baking and gelling, in which there is produced an active isocyanate group (NCO) which participates in the crosslinking reaction with the OH or COOH group of the crosslinkable PVC. The blocked polyisocyanate compound (B) is usually used in an amount of 20 to 60 parts by weight to 100 parts by weight of the crosslinkable PVC.

The isocyanuric acid compound (component C) contains two or more groups selected from epoxy, OH and COOH which participate in the crosslinking reaction with the OH or COOH of the above crosslinkable PVC together with the active NCO of the blocked polyisocyanate compound. The isocyanuric acid compound includes, for example, 1,3,5-triglycidyl isocyanurate, tris-1,3,5-(2-carboxyethyl) isocyanurate, tris-1,3,5-(2-hydroxyethyl) isocyanuate, and the like. The isocyanuric acid compound (C) is usually used in an amount of 5 to 35 parts by weight, preferably 10 to 20 parts by weight, to 100 parts by weight of the crosslinkable PVC. When the amount of the isocyanurlc acid compound is ever 35 parts by weight, the final sealer composition has inferior physical properties (particularly less elongation), and when the amount is less than 5 parts by weight, the composition does not exhibit sufficient crosslinking properties and hence can not show the desired effect for the prevention of cracking of the coating film.

The polyvinyl chloride plastisol sealer composition of the present invention comprises the above mentioned crosslinkable PVC (component A), blocked polyisocyanate compound (component B) and isocyanuric acid compound (component C), and may optionally incorporate any conventional additives, such as plasticizerm (e.g. phthalates such as di(n-butyl) phthalate, octyl decyl phthalate, diisodecyl phthalate, di(2-ethylhexyl) phthalate, butyl benzyl phthalate, dioctyl phthalate (DOP), dinonyl phthalate, diisononyl phthalate (DINP), diheptyl phthalate, dodecyl benzyl phthalate, butylphthalyl-butylglycol, etc.; aliphatic dibasic acid esters such as dioctyl adipate, didecyl adipate, dioctyl sebacate, di(2-ethylnexyl) adipate, diisodecyl adipate, di(2-ethylhexyl) azelate, dibutyl sebacate, di(2-ethylhexyl) sebacate, etc.; phosphates such as tricresyl phosphate, trioctyl phosphate, tributyl phosphate, tri(2-ethylhexyl) phosphate, 2-ethylhexyl diphenyl phosphate, etc.; epoxy plasticizers such as epoxidized soybean oil, epoxidized tall oil fatty acid 2-ethylhexyl esters, etc.; and other conventional polyester plasticizers); fillers (e.g. precipitated calcium carbonate or a product thereof surface-treated with an aliphatic acid or resin acid, ground calcium carbonate, calcium oxide, clay, talc, silica, glass powder, etc.); stabilizers for inhibiting dehydrochloric acid reaction (e.g. metal soap, organic tin compounds, etc.); heat stabilizers (e.g. dibutyl tin laurate, epoxidized soybean oil, Ba or Zn compounds, etc.), pigments (e.g. titanium white, etc.); fire retardants, and the like, which are used in an appropriate amount usually used in the conventional sealer composition.

The sealer Composition of the present invention can mainly be used as a body-sealer of automobiles, but may also be used for other utilities, for example, as an underbody coating material which is used for prevention of injuries to body due to stone chipping on the road during running of automobiles.

EXAMPLES

The present invention is illustrated by the following Examples and Reference Examples but should not be construed to be limited thereto.

EXAMPLES 1 AND 2 AND REFERENCE EXAMPLES 1 TO 3

The materials as shown in the following Table 1 are mixed and the mixture is degassed under reduced pressure to give polyvinyl chloride plastisol sealer compositions.

The evaluation of cracking of the coating film and other properties as shown in Table 1 were carried out in the following manner.

(1) Viscosity: using BH viscometer, with rotor #7, at number of revolution 20 r.p.m., and 20° C.

(2) Adhesion:

The sealer compositions of Examples 1 and 2 and Reference Examples 1 to 3 were each applied in the bead form onto a surface of a steel panel coated by a cationic electrodeposition and subjected to baking and gelling at 120° C. or 140° C. for 30 minutes. After cooling, the sealer layer thus formed was peeled and the adhesion was evaluated by the criteria of CF: cohesive failure, i.e. failure of the sealer, and AP: adhesive failure, i.e. the interfacial failure between the electrodeposited coating layer and the sealer.

(3) Cracking Of the coating films:

The sealer compositions of Examples 1 and 2 and Reference Examples 1 to 3 were each coated in the bead form (10 mm$\phi$ half round shape × 100 mm) on a surface of a steel panel coated by an electrodeposition and subjected to baking and gelling at 120° C. for 10 minutes. On the sealer composition layer was further coated an intercoat-paint (melamine alkyd resin paint) by spray coating (thickness, about 30 $\mu$m), followed by baking and curing by heating at 140° C. for 30 minutes, and further thereon was coated a topcoat-paint (melamine alkyd resin paint) by spray coating (thickness, about 30 $\mu$m), followed by baking and curing by heating at 160° C. and 170° C. for 30 minutes respectively, and then, the cracking of the surface of the cured topcoat on the sealer was observed and evaluated by the following criteria:

◯: No cracking, good properties
Δ: Cracking of less than 1 mm width
x: Cracking of more than 1 mm width (4) Elongation:

The sealer compositions of Examples 1 and 2 and Reference Examples 1 to 3 were each applied in a thickness of 2 nun onto a surface of a release paper and subjected to baking and gelling at 140° C. for 60 minutes. After gelling, the elongation of the sealer composition with #2 Dumbbell in accordance with the method as described in Japanese Industrial Standard (JIB) K6830.

(5) Storage stability:

The sealer compositions of Examples I and 2 and Reference Examples 1 to 3 were each entered in a 250 cc Glass-made vessel and sealed. After keeping the vessel at 40° C. for 5 days, the change of viscosity of the composition was measured. The storage stability of the composition was evaluated by the percentage of the viscosity after being kept at 40° C. for 5 days of the initial viscosity of the sealer composition. When the number of the percentage of viscosity is smaller, and hence, the increase of the viscosity is smaller, it is evaluated that the storage stability is better.

These results are shown in Table 1.

TABLE 1

| | Examples | | Ref. Examples | | |
|---|---|---|---|---|---|
| | 1 | 2 | 1 | 2 | 3 |
| PVC for plastisol (*1) | 200 | 200 | 200 | 300 | 200 |
| Crosslinker PVC (*2) | 100 | 100 | 100 | — | 100 |
| Plasticizer (*3) | 400 | 400 | 400 | 400 | 400 |
| Surface treated calcium carbonate | 270 | 270 | 270 | 270 | 270 |
| Calcium carbonate | 300 | 300 | 315 | 300 | 355 |
| Blocked polyisocyanate (*4) | 85 | 85 | 85 | 85 | — |
| Polyamide resin (adhesive promoter) (*5) | — | — | — | — | 30 |
| 1,3,5-Triglycidyl iso-cyanurate | 15 | — | — | 15 | 15 |
| Tris-1,3,5-(2-hydroxyethyl) isocyanurate | — | 15 | — | — | — |
| Other additives | 60 | 60 | 60 | 60 | 60 |
| Total (parts by weight) | 1430 | 1430 | 1430 | 1430 | 1430 |
| (1) Viscosity (poise) | 900 | 950 | 1200 | 920 | 750 |
| (2) Adhesion | | | | | |
| 120° C. × 30 min. | CF | CF | CF | CF | AF |
| 140° C. × 30 min. | CF | CF | CF | CF | CF |
| (3) Cracking of the coating film | | | | | |
| 160° C. × 30 min. | ◯ | ◯ | Δ | x | x |
| 170° C. × 30 min. | ◯ | Δ | x | x | x |
| (4) Elongation (%) | 180 | 180 | 210 | 230 | 150 |
| (5) Storage | 125 | 120 | 120 | 115 | 140 |

TABLE 1-continued

|  | Examples | | Ref. Examples | | |
| --- | --- | --- | --- | --- | --- |
|  | 1 | 2 | 1 | 2 | 3 |
| stability (%) | | | | | |

Notes in Table 1:
*1: Zeone 121, manufactured by Nippon Zeone K.K.
*2: Vinica P-100, manufactured by Mitsubishi Kasei Vinyl K.K.
*3: Diisononyl phthalate
*4: Trimer of hexamethylene diisocyanate blocked with nonylphenol
*5: Barsamide 115, manufactured by Henkel Hakusui K.K.

What is claimed is:

1. A polyvinyl chloride plastisol sealer composition which comprises (A) a polyvinyl chloride resin containing a hydroxy group or a carboxy group in the molecule (B) a blocked polyisocyanate compound, and (C) an isocyanuric acid compound containing two or more groups selected from epoxy group, hydroxy group, and carboxy group in the molecule, wherein the blocked polyisocyanate compound (B) and the isocyanuric acid compound (C) are contained in an amount of 20 to 60 parts by weight and 5 to 35 parts by weight, respectively to 100 parts by weight of the polyvinyl chloride resin (A).

2. The sealer composition according to claim 1, wherein the polyvinylchloride resin (A) is a copolymer of vinyl chloride with a monomer containing hydroxy group or carboxy group in the molecule selected from the group consisting of 2-hydroxyethyl acrylate, 2-hydroxyethyl methacrylate, 2-hydroxypropyl acrylate, hydroxybutyl vinyl ether, maleic acid, maleic anhydride, acrylic acid, and methacrylic acid.

3. The sealer composition according to claim 1, wherein the blocked polyisocyanate compound (B) is prepared by blocking a polyisocyanate compound selected from aliphatic polyisocyanates, alicyclic polyisocyanates, aromatic polyisocyanates, trimers or dimers of these polyisocyanates, and prepolymers produced from a polyisocyanate and a compound containing an active hydrogen with a blocking agent selected from alcohols, phenols, oximes, acid amides, active methylene-containing acid esters, mercaptanes, amines, imidazoles, carbamates, imines, and sulfites.

4. The sealer composition according to claim 1, wherein the isocyanuric acid compound is a member selected from the group consisting of 1,3,5-triglycidyl isocyanurate, tris-1,3,5-(2-carboxyethyl) isocyanurate, and tris-1,3,5-(2-hydroxyethyl) isocyanurate.

* * * * *